June 17, 1941.   J. J. FRANZMAN   2,245,557
APPARATUS FOR TESTING USED LUBRICATING OILS
Filed Dec. 22, 1938
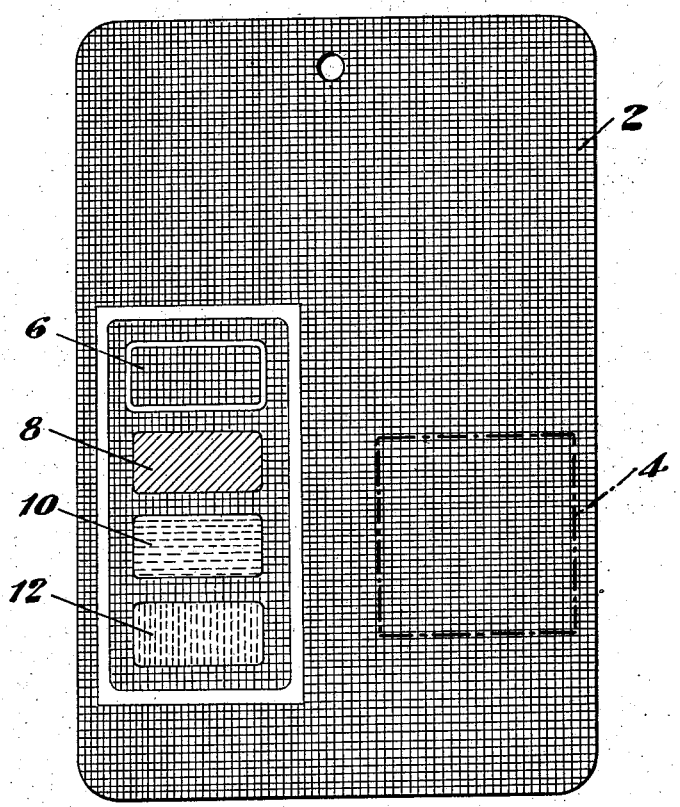
INVENTOR
JOHN J. FRANZMAN
BY
ATTORNEY Patented June 17, 1941

2,245,557

UNITED STATES PATENT OFFICE 2,245,557

APPARATUS FOR TESTING USED LUBRICATING OILS

John J. Franzman, Freeport, N. Y., assignor to Cities Service Oil Company, New York, N. Y., a corporation of Pennsylvania Application December 22, 1938, Serial No. 247,143

3 Claims. (Cl. 88—14)

The present invention relates to apparatus for testing lubricating oils. More particularly the apparatus is intended for the purpose of indicating the quality and condition of lubricating oils contained in the crank case or other receptacle in which oil of an internal combustion engine is contained.

The primary object of the present invention is to provide a simple, quick and inexpensive means for determining the quality of oil in an engine.

Another object of the invention is to provide a simple means for determining the condition of used oil, without the necessity of subjecting the oil to involved chemical tests.

Heretofore used lubricating oils have been tested by various means, included among which were the use of absorbing or blotter paper having a bibulous surface. One objection of this type of device is that while the absorbent paper absorbed most of the contaminating agent present in the oil, the dirt remained on the surface of the paper and in most instances the color was of fairly uniform shade. Another suggested method for testing used oil was by the use of a mirror finished testing gauge. It has been found however, that with this type of testing gauge different oils containing varied contaminating agents have a somewhat similar color on the mirror finished gauge, and a quick accurate test is impossible.

This results from the fact that slightly used oil darkens, and when placed on a mirror-finished surface, it is difficult to differentiate between the various degrees of darkness, or the difference between a useable type of oil and a non-useable type. The present invention overcomes this difficulty by placing the oil on a dark background which makes the dark color of the oil appear to be much lighter than when placed on a white background. This has the advantage that various shades of dark used oil can thus be easily and quickly differentiated and the degree of color variation is more prominent.

An important feature of the present invention is that by the use of the test plate hereafter described, a simple and accurate determination can be had when lubricating oil is no longer fit for use. For example, if any one test shows the presence of water in used oil, that oil should be drained from the engine. If however, new oil is put in and is tested after a short period of use and again the presence of water is detected, it can reasonably be assumed that water from some source is seeping into the oil system.

The present invention resides in the use of a plate having a black non-oil-absorbing surface for clearly developing and bringing out the dark colors in used lubricating oils, and comparing these colors to a series of fixed colors shown on the plate.

It is known that when lubricating oil is used in an engine, the oil loses its rich greenish cast and acquires a black, tan, gray or purplish cast dependent upon the impurities present in the oil after the oil has been used for about 1000 to 1500 miles in the average engine. The various colors which the oil acquires after use as noted above can be attributed to the presence of some foreign matter in the oil, the breaking-down of the oil, the presence of water or carbon, or some metal and solid impurities in the oil.

The invention can best be understood from the following description taken in connection with the drawing in which the single figure indicates a front elevation view of the improved test plate embodying the preferred form of the invention.

Referring to the drawing, 2 indicates a plate which may be of any shape and preferably made of sheet metal. The entire plate may be painted or enameled black as shown in the drawing, or have on the surface of the plate an area numbered 4 colored black and the remainder of the plate may be of any desired color. It is important that the black surface shall not be soluble or affected by the oil being tested, particularly mineral oils. The plate illustrated in the drawing has a black vitreous enamel surface which has a high gloss. This black surface is very effective in developing the colors in the oil being tested. The black enamel surface does not have its color changed by the oil due to solubility or chemical reaction. At one side of the surface a plurality of colored areas are provided numbered respectively 6, 8, 10 and 12. Of the series of areas, the first area 6 is black or midnight blue; the second area 8 is colored a yellowish tan; the third area 10 is a blackish gray; and the fourth area 12 is a pinkish purple shade.

In using the improved test plate, a drop of the oil to be tested is deposited on any part of the surface of the plate 2 if the entire surface is colored black, or on the black area 4. At once the oil will appear to have a distinctive shade due to the property of the surrounding glossy black surface. If the oil reflects a color similar to that of area 6 it is indicative that the oil has lost all of its lubricating properties and is no longer effective for use. Oil in this condition should be immediately drained from the engine and fresh oil substituted. The presence of water in used lubricating oil can be detected if the oil reflects a color simulating the color of area 8; likewise the presence of lead salt impurities can be detected as the oil assumes a grayish color similar to that of area 10. Excess acidity in used lubricating oils is revealed if the oil on the black surface reflects a color similar to that of area 12.

If the spot of oil deposited on the black glossy surface indicates a color that does not fall within any of the shades enumerated above, or a slight variation thereof, but retains its greenish cast, it is apparent that the oil is in good condition and can be used with safety in the motor.

It is obvious that various modifications may be made in the manufacture of the test plate without departing from the scope of the invention. For example, the plate is not limited to a black glossy metallic surface but a material such as black wood, or any non-oil-absorbing black surface with a decalcomania containing the colors heretofore described can be used.

Having thus described the invention, what is claimed as new is:

1. A device for testing used lubricating oils comprising a plate provided with a plurality of colored areas corresponding to colors ordinarily acquired by used lubricating oils, each of said colored areas being surrounded by black surface, a black surface area on said plate upon which a quantity of used lubricating oil can be deposited and by which no oil will be absorbed or dissolved, whereby the color indicated by the used oil placed upon said black surface area may be compared as to color with any one of the said colored areas.

2. A device for testing used lubricating oils comprising a plate provided with a plurality of colored areas corresponding to colors ordinarily developed in lubricating oils when used, each of said colored areas being surrounded by a black surface, a black non-oil-absorbing surface area on said plate upon which a quantity of used lubricating oil can be deposited, whereby the color indicated by used oil placed upon said black surface area may be compared as to color with any one of the said colored areas.

3. A plate for testing used lubricating oils which includes a plurality of colored areas the colors of which correspond to those ordinarily acquired by used lubricating oils, said colored areas being spaced apart and occupying only a portion of the surface area of said plate, substantially all of the remainder of the surface area of the plate being a glossy black and thereby providing a black background for each of said colored areas, and said black surface area including sufficient space for receiving a quantity of used lubricating oil the indicated color of which is to be compared with the colors of said colored areas.

JOHN J. FRANZMAN.